Nov. 16, 1948.  N. O. MYKLESTAD  2,453,808
HYDRAULIC BRAKE

Filed Feb. 12, 1947  2 Sheets-Sheet 1

INVENTOR
Nils O. Myklestad

Nov. 16, 1948.   N. O. MYKLESTAD   2,453,808
HYDRAULIC BRAKE

Filed Feb. 12, 1947   2 Sheets-Sheet 2

Inventor:
Nils O. Myklestad

Patented Nov. 16, 1948

2,453,808

UNITED STATES PATENT OFFICE 2,453,808

HYDRAULIC BRAKE

Nils O. Myklestad, Pasadena, Calif.

Application February 12, 1947, Serial No. 727,960

7 Claims. (Cl. 188—152)

This invention relates to improvements in hydraulic brakes of the internally-expanding self-actuating type.

In the ordinary brake of this type there are usually two brake shoes which are pushed against the inside of the rotating brake drum by means of hydraulic pressure applied to one end of each shoe through the medium of two pistons sliding in a common cylinder, the other end of each shoe is hinged to a fixed frame so that the shoe is free to rotate. In a self-actuating brake the hinge axis for each shoe is located a considerable distance inside the drum so that the friction force on one shoe will greatly aid in turning the shoe about its hinge, and thereby push it against the drum for rotation of the drum in one direction, while the friction force on the other shoe will have the same effect on it for rotation in the other direction. This makes the brake self-actuating as one shoe is always actuated by the friction force itself. An objection to such a construction, however, resides in the fact that it is very sensitive to variations in the coefficient of friction between the brake lining, which is attached to the outside of each shoe, and the inside of the drum. A small increase in the value of this coefficient will make the brake much more self-actuating, which is dangerous, while a small decrease in the friction coefficient means that a greatly increased pressure will be required in order to obtain the same braking torque.

The object of the present invention is to provide an improved brake in which the hinges of the brake shoes are movably mounted and have their movements in turn controlled by hydraulic pressure in such a way that the center of pressure between the drum and the self-actuated brake shoe will be shifted in accordance with any change in the coefficient of friction. This shifting of the center of pressure is in such a direction so as to greatly reduce the change in the self-actuation of the brake when the friction coefficient changes. This in turn will greatly reduce the increase, or decrease, in the braking torque due to an increase, or decrease, in the coefficient of friction. It will also prevent the brake from becoming self-locking at any possible value of the coefficient of friction.

With the foregoing and other objects in view, which will be made manifest in the following detailed description and specifically pointed out in the appended claims, reference is made to the accompanying drawing for an illustrative embodiment of the invention, wherein:

Figure 1:
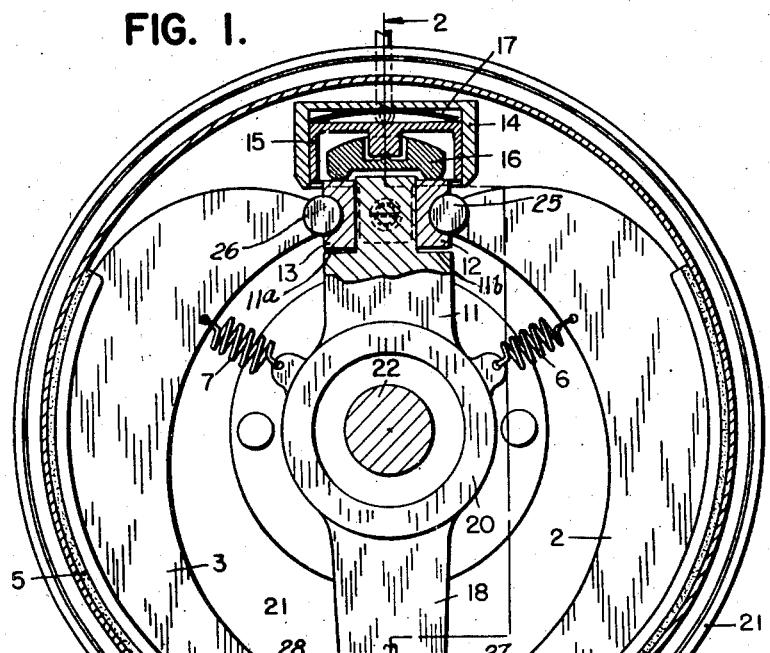
Figure 1 is a diametrically vertical section through the brake embodying the present invention illustrating the brake in an engaged position and taken substantially along line 1—1 in Figure 2.

Referring to the accompanying drawing, wherein similar reference characters designate similar parts throughout, the brake comprises a drum 1 which is attached to shaft 22 and rotates with the wheel, which it carries. The stationary hub 20 is bolted to flange 21 and carries brackets 11 and 18. Bracket 18 holds cylinder 8 in which pistons 9 and 10 are free to move under the action of spring 19 and hydraulic pressure in cylinder 8. Suitable seals are employed to prevent the brake fluid from leaking past pistons 9 and 10, said fluid being fed to cylinder 8 through tube 23. Brake shoes 2 an 3 carrying linings 4 and 5, respectively, are pivotable about cylindrical rods 25 and 26 attached to their upper ends, the rods fitting in corresponding grooves in blocks 12 and 13, respectively. The lower ends of the shoes are secured to ball pivots 27 and 28 which contact the pistons 9 and 10, respectively, contact being maintained at all times by means of springs 6 and 7 which are sufficiently strong as to compress spring 19 when no fluid pressure is applied to the pistons 9 and 10. While the ball pivots are constantly bearing against the pistons 9 and 10, they are not secured thereto and hence are free to move vertically relative to the pistons. Blocks 12 and 13 are slidably mounted in corresponding grooves in bracket 11, their downward motion being checked by shoulders 11a and 11b in said bracket while their upward motion is controlled by lever 16 the two knife edges 16a and 16b of which rest in corresponding grooves in piston 15, said piston being free to move in cylinder 14 its motion being controlled by disk spring 17 and hydraulic pressure produced by brake fluid entering through tube 23. Cylinder 14 is rigidly attached to bracket 11, and suitable seals are used to prevent leakage of brake fluid between piston 15 and said cylinder.

Generally, the operation of my device is as follows: if the drum 1 is rotating and if the coefficient of friction of the lining is normal, actuation of the brake pedal to engage the brake causes the block 12 to assume an intermediate position such as shown in Fig. 1. If the friction is greater than normal, the effect is to shift the entire shoe 2 upwards to relieve the pressure exerted by the toe portion of the shoe and thereby to decrease the self-actuating tendency of the brake. If the friction is less than normal there is a corresponding reduction in the self-actuating tendency with a consequent decrease in the upward force exerted by the shoe. In this event, fluid pressure in cylinder 14 is sufficient to overcome the upward force to move block 12 downwards to increase the pressure of the toe portion against the drum and thereby to increase the self-actuating tendency without a corresponding increase in force actually exerted at the brake pedal.

Figure 4:
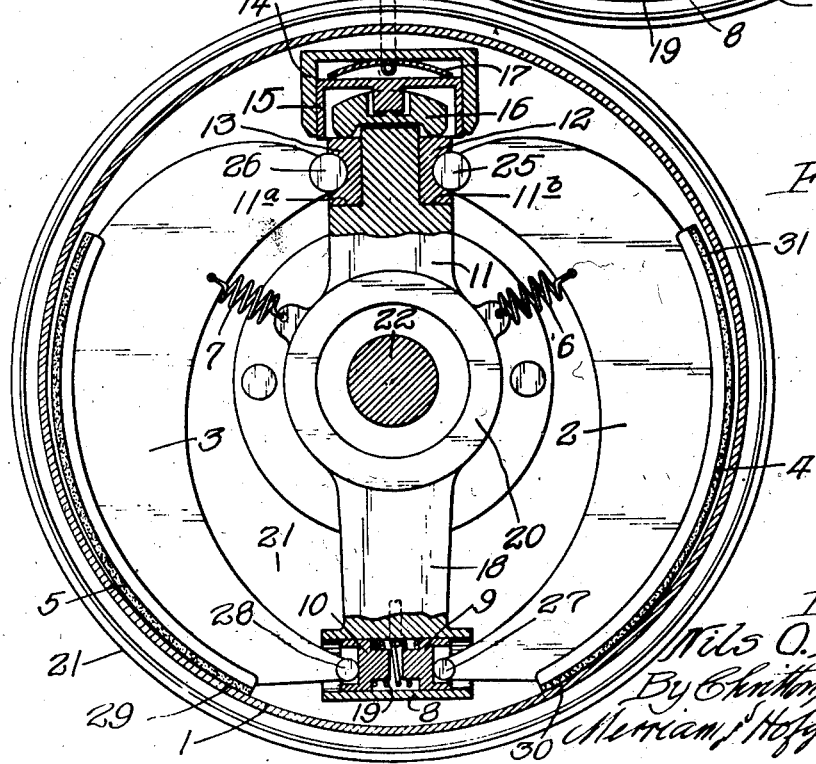

The operation of the brake as just described is performed by the specific parts of the device substantially as follows: When the brake is disengaged shoes 2 and 3 are held away from drum 1 by means of springs 6 and 7, and blocks 12 and 13 are held down against the shoulders 11a and 11b of bracket 11 by means of disk spring 17. When the brake is being engaged fluid is fed from the master cylinder, which is actuated by the brake pedal, through tube 23 to cylinders 8 and 14, and hydraulic pressure on pistons 9 and 10 causes the shoes 2 and 3 to pivot around the rods 25 and 26 to push the toe portions 29 and 30 of each shoe against drum 1. It will now be assumed that the drum is rotating in a counter-clockwise direction so that shoe 2 will do most of the braking and the various parts are in the position shown in Fig. 4. The friction between drum 1 and lining 4 will now aid in turning shoe 2 about its pivot axis thereby pressing the entire shoe against the drum and increasing the pressure between said drum and lining 4 which again will increase the braking action by turning the shoe further. This makes the brake self-actuating. It is obvious that the degree to which the brake is self-actuating is dependent on the coefficient of friction between drum 1 and lining 4 as long as block 12 does not move; this is the case in an ordinary self-actuating brake. In the brake under discussion, however, the vertical reaction on block 12 will always be in a definite ratio to the actuating force on piston 9 due to the fact that cylinders 8 and 14 are connected through tube 23; this ratio of forces is so determined as to give approximately uniform pressure on lining 4 for the design value of the coefficient of friction, and when the area of piston 9 is given this ratio then determines the area of piston 15. Suppose now the coefficient of friction increases above the design value due to sand or grit contaminating the linings, or for any reason; then the friction force on shoe 2, which acts predominantly upward, will also increase and move block 12 a small distance upward until the pressure on lining 4 has been redistributed to the point where equilibrium of forces has again been established. The pressure has now been increased on the upper part of lining 4 to press the heel portion 31 more tightly against the drum and decreased on the lower or toe part 30 which counteracts the increase in self-actuation due to the increase in the value of the coefficient of friction. The opposite is true when the coefficient of friction decreases for example, when the lining becomes wet. The device is so constructed that there is always some clearance between the lower end of block 12 and the corresponding shoulder or stop 11b in bracket 11 when the brake is engaged, so that block 12 also is free to move downward when the coefficient of friction decreases. It can be seen that downward movement of block 12 serves to press the toe portion 30 more firmly against the drum and thereby to increase the self-actuation of the brake. It will of course be appreciated that the total required motion of block 12, and hence of piston 15, is exceedingly small so that no large transfers of brake fluid will take place during such motion.

As long as drum 1 is rotating in a counter-clockwise direction block 13 will always rest against the corresponding shoulder or stop 11a in bracket 11 while block 12 will center itself in accordance with the value of the coefficient of friction. On the other hand, when drum 1 is rotating in a clockwise direction the roles of blocks 12 and 13 will be reversed as will the roles of other corresponding left and right hand parts.

Figure 2:
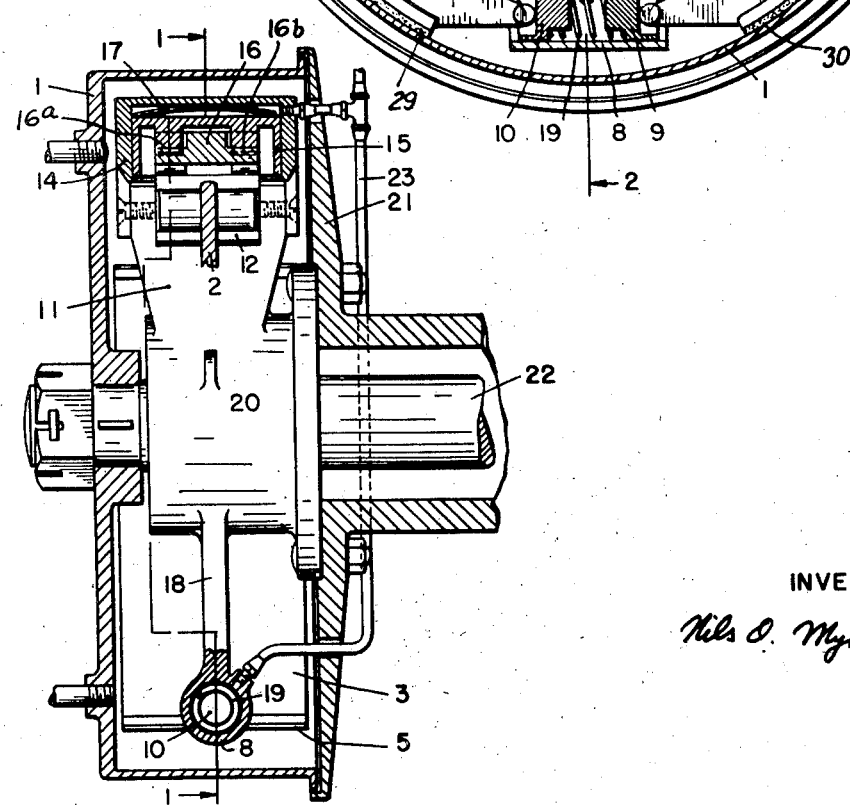
Figure 2 is a vertical section taken substantially along line 2—2 of Figure 1 and Figures 3 and 4 are views like Figure 1 with the brake in unengaged and partially engaged positions respectively.
Figure 3:
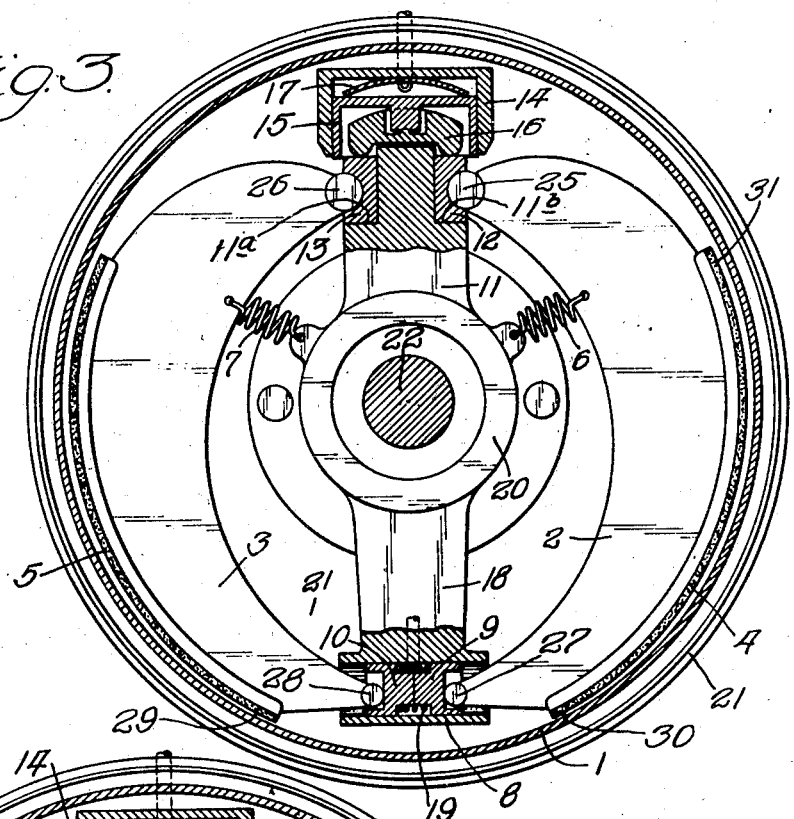

Theoretical calculations for a brake of the design shown in Figures 1 and 2 show that for this brake the ratio of braking torque to actuating force is much less dependent on the coefficient of friction than is the case for an ordinary self-actuating brake, assuming that this ratio is the same for both brakes at the design value of the coefficient of friction.

Various changes may be made in the details of construction of the safety brake without departing from the spirit and scope of the invention as defined by the appended claims.

I claim:

1. In a brake for a rotating cylindrical drum; an arcuate shoe adapted to be moved into engagement with the inner surface of said drum; a separate mounting member for each end of the shoe, said mounting members providing for at least limited movement of said shoe in a direction generally parallel to a chord through the ends thereof; an actuating arrangement for moving the member at one end of the shoe in a direction generally normal to said chord to cause engagement of that end of the shoe with the drum with a desired actuating force; and means operative on the other mounting member for urging it generally radially inwardly with a force having a predetermined ratio to said actuating force.

2. In a brake for a rotating cylindrical drum: an arcuate shoe adapted to be moved into engagement with the inner surface of said drum; a separate mounting member for each end of the shoe, said mounting members providing for at least limited movement of said shoe in a direction generally parallel to a chord through the ends thereof; a hydraulic actuating arrangement for moving the member at one end of the shoe in a direction generally normal to said chord to cause engagement of that end of the shoe with the drum with a desired actuating force; and a hydraulic arrangement operative on the other mounting member, said two hydraulic arrangements being in open communication during actuation of the brake for urging said other mounting member generally radially inwardly with a force having a predetermined ratio to said actuating force.

3. Apparatus of the character claimed in claim 2, wherein said mounting members each also provide for at least limited pivotal movement of the end of the shoe carried thereby.

4. Apparatus of the character claimed in claim 2, wherein said mounting members each also provide for at least limited pivotal movement of the end of the shoe carried thereby, and wherein a fixed stop limits the inward movement of said other mounting member and a spring holds this last mentioned member against the stop in the absence of brake actuating force.

5. In a self-energizing brake for a rotating cylindrical drum having a pair of arcuate shoes therein and a hydraulic actuating arrangement for moving one end of each shoe into engagement with the drum with a desired actuating force, an equalizing arrangement including: separate mounting members for the other ends of each of said shoes, each member providing for at least limited pivotal movement of that end of each shoe and for at least limited movement of each shoe in a direction generally parallel to a chord through the ends thereof; fixed stops limiting the inward movement of each of said mounting members; and means actuated by outward movement of one of said mounting members for applying an inward force to the other of said mounting members.

6. In a self-energizing brake for a rotating cylindrical drum having a pair of arcuate shoes therein and a hydraulic actuating arrangement for moving one end of each shoe into engagement with the drum with a desired actuating force, an equalizing arrangement including: separate mounting members for the other ends of each of said shoes, each member providing for at least limited pivotal movement of that end of each shoe and for at least limited movement of each shoe in a direction generally parallel to a chord through the ends thereof; fixed stops limiting the inward movement of each of said mounting members; and a lever pivotally mounted intermediate its ends and actuated at one end by outward movement of one of said mounting members for causing the other end to apply an inward force to the other of said mounting members.

7. In a self-energizing brake for a rotating cylindrical drum having a pair of arcuate shoes therein and a hydraulic actuating arrangement for moving one end of each shoe into engagement with the drum with a desired actuating force, an equalizing arrangement including: separate mounting members for the other ends of each of said shoes, each member providing for at least limited pivotal movement of that end of each shoe and for at least limited movement of each shoe in a direction generally parallel to a chord through the ends thereof; fixed stops limiting the inward movement of each of said mounting members; a lever pivotally mounted intermediate its ends and actuated at one end by outward movement of one of said mounting members for causing the other end to apply an inward force to the other of said mounting members; and a hydraulic arrangement operative on the pivotal mounting of said lever, said last-mentioned hydraulic arrangement being in open communication with the hydraulic actuating arrangement during actuation of the brake for urging said lever inwardly with a force having a predetermined ratio to said actuating force.

NILS O. MYKLESTAD.

REFERENCES CITED

The following references are of record in the file of this patent:

UNITED STATES PATENTS

| Number | Name | Date |
|---|---|---|
| 1,736,046 | Madden | Nov. 19, 1929 |
| 1,804,697 | Lord | May 12, 1931 |
| 1,806,151 | Dick | May 19, 1931 |
| 2,115,230 | Oliver | Apr. 26, 1938 |